(12) United States Patent
Gouget et al.

(10) Patent No.: US 8,260,834 B2
(45) Date of Patent: Sep. 4, 2012

(54) METHOD SYSTEM AND DEVICE FOR GENERATION OF A PSEUDO-RANDOM DATA SEQUENCE

(75) Inventors: Aline Gouget, Paris (FR); Hervé Sibert, Paris (FR)

(73) Assignee: France Telecom, Paris (FR)

( * ) Notice: Subject to any disclaimer, the term of this patent is extended or adjusted under 35 U.S.C. 154(b) by 1104 days.

(21) Appl. No.: 11/884,435

(22) PCT Filed: Feb. 13, 2006

(86) PCT No.: PCT/FR2006/050124
§ 371 (c)(1),
(2), (4) Date: Jun. 27, 2008

(87) PCT Pub. No.: WO2006/085038
PCT Pub. Date: Aug. 17, 2009

(65) Prior Publication Data
US 2009/0157779 A1  Jun. 18, 2009

(30) Foreign Application Priority Data

Feb. 14, 2005  (FR) ..................... 05 01481

(51) Int. Cl.
*G06F 1/02* (2006.01)
(52) U.S. Cl. ...................................................... 708/250
(58) Field of Classification Search .................. 708/250
See application file for complete search history.

(56) References Cited

U.S. PATENT DOCUMENTS 5,844,925 A    12/1998  Dent et al.

FOREIGN PATENT DOCUMENTS

| CN | 1302497 A | 7/2001 |
| EP | 0 619 659 | 10/1994 |
| JP | 10-190523 | 7/1998 |

OTHER PUBLICATIONS

C. K. Chan et al., "Design of keystream generator", Electronics Letters, vol. 34, No. 12, pp. 1206-1207, Jun. 11, 1998.

*Primary Examiner* — Tan V. Mai
(74) *Attorney, Agent, or Firm* — Conzen O'Connor (57) ABSTRACT

A method and a generator for generating a pseudo-random data sequence (3), including combining means for combining data belonging to a plurality of initial data sequences (9a, 9b, 9c) using a procedure for searching for at least one search pattern.

8 Claims, 4 Drawing Sheets

METHOD SYSTEM AND DEVICE FOR GENERATION OF A PSEUDO-RANDOM DATA SEQUENCE

RELATED APPLICATIONS

This is a U.S. National Stage of International Application No. PCT/FR2006/050124 filed on Feb. 13, 2006.

FIELD OF THE INVENTION

The invention relates to encryption/decryption and concerns a system and a method of generating a pseudorandom data sequence.

The invention finds a highly-advantageous application in creating a series of bits intended for symmetrical encryption, where encryption and decryption use the same secret key. The invention relates to a streaming encryption method that adds a message bit by bit to a pseudorandom data sequence of the same length and in which the encryption operation and the decryption operation are identical. Note that symmetrical encryption is commonly employed in all types of communication, such as mobile communication (GSM, UMTS, etc.), the Internet (SSL, etc.), smart cards (bank cards), etc.

BACKGROUND OF THE INVENTION

The most widespread streaming encryption method generates an encryption series independently of the message to be encrypted using linear feedback shift registers to save on hardware.

The major drawback of linear feedback shift registers is their linearity. Knowing a number of output bits of the register equal to the length of the register and the feedback polynomial associated with the register makes it possible to determine the output bits and all subsequent states of the register.

To "break" the linearity of linear feedback shift registers, the outputs of a plurality of registers, and possibly their internal states, are commonly combined, for example using a non-linear Boolean function.

Figure 6:
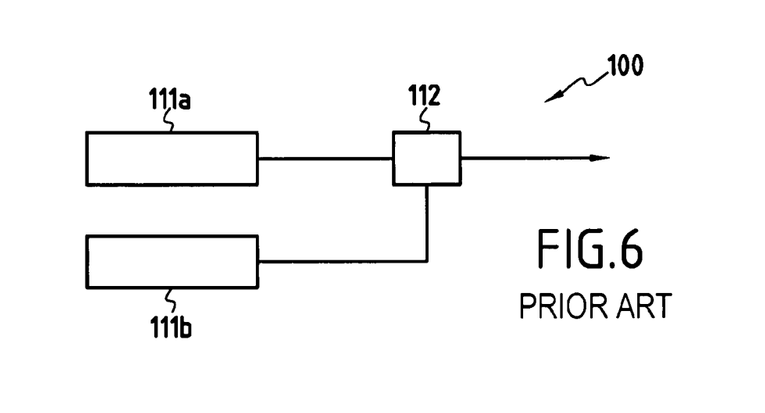
FIG. 6 is a diagram showing a prior art generator.

FIG. 6 shows a generator 100 of this kind, known as a shrinking generator, described in European Patent Application EP 0 619 659 and including a first linear feedback shift register 111a, a second linear feedback shift register 111b, and means 112 for selecting the output of the generator 100.

Thus, on each shift, the two registers 111a and 111b are shifted simultaneously, and the output of the device 100 is equal to the output of the second register 111b if the output of the first register 111a is "1"; if not, no bit is output.

The shrinking generator combines not only the outputs of two linear feedback shift registers but also, more generally, any pair of series of bits. The shrinking generator is part of a class of streaming encryption methods in which one linear feedback shift register controls another. The idea is to vary the number of shifts between the registers employed and between two consecutive bits, in order to break the linearity of the registers.

A variant of the shrinking generator, called the self-shrinking generator, is based on the same principle but uses only one register. The output bits of the register are read two by two, and the first bit controls whether the second bit is output, so that the output of the system is the second bit if the first bit is a "1"; if not, no bit is output.

Using only linear feedback shift registers has numerous drawbacks. The main one is the vulnerability caused by the linearity of the device. There are also drawbacks if registers are combined by a Boolean function. At hardware level, they are a result of the complexity of the function implementation. Moreover, the function is fixed and can be attacked.

Statistical methods have shown up certain weaknesses of the shrinking generator and other clock-controlled encryption methods. In particular, in the shrinking generator, the number of shifts effected by the two registers between two output bits varies, but has the same value for both registers.

SUMMARY OF THE INVENTION

An object of the invention is to eliminate those drawbacks and to simplify the generation of a pseudorandom data sequence of high quality.

Another object is to produce a generator that is highly effective and of relatively low cost.

These and other objects are attained in accordance with one aspect of the invention directed to a method of generating a pseudorandom data sequence comprised of a succession of output patterns that are obtained by the steps of:
  selecting at least one search pattern;
  searching for said at least one search pattern in at least one initial data sequence that is one of a plurality of initial data sequences;
  determining an output pattern according to an application that depends on said search and on the content of at least two initial data sequences from said plurality of initial data sequences; and
  reassigning the selection of and the search for at least one search pattern within said plurality of initial data sequences.

Thus, one embodiment of the invention is based on detecting patterns in order to combine or "mix" a plurality of initial data sequences to obtain a pseudorandom sequence. Although it is simple to implement, this method has the inherent complexity to be able to produce a pseudorandom data sequence of high quality. The various operations of the method are distributed over the plurality of initial data sequences so that the distribution of these operations is extremely difficult to discover, thereby enhancing the quality of the pseudorandom data sequence.

This method therefore increases the complexity of the relationship between the initial data sequences and the pseudorandom data sequence so that it is difficult to predict the quality of the pseudorandom data sequence.

Said reassignment is advantageously effected as a function of said search and/or the content of an initial data sequence that is one of said plurality of initial data sequences.

Thus the distribution of the operations over the initial data sequences can vary as the process proceeds, further enhancing the quality of the pseudorandom data sequence.

According to one aspect of the invention, said steps are effected by a series of rules including:
  a first set of rules for defining at least one shift mode for shifting at least one window over each initial data sequence of said plurality of initial data sequences, there being a plurality of windows because each window is associated with an initial data sequence;
  a second set of rules that manages selecting said at least one search pattern and/or updating said output pattern and/or reassigning the operations by means of a plurality of pointers manipulating said plurality of windows; and
  a third set of rules that determine modes of shifting said plurality of windows.

Thus the interaction between the various steps or operations can be managed and implemented simply and effectively.

According to one particular aspect of the invention, said plurality of initial data sequences include at least two initial data sequences and the windows are of size 1 so that said at least two initial data sequences can be read continuously bit by bit to determine an output pattern of 1 bit.

Thus the search for the pattern or patterns can be accelerated at the same time as economizing on computation time.

According to another aspect of the invention, each bit of said pseudorandom data sequence can be combined with a corresponding bit from a data sequence of a message to be encrypted by modulo 2 addition to form an encrypted data sequence.

Accordingly, the encrypted data sequence produced has an internal complexity making it difficult to decrypt. Moreover, the decryption mechanism being identical to the encryption mechanism, it therefore has the same advantages.

Another aspect of the invention is directed to a generator of a pseudorandom data sequence, including combining means for combining data belonging to a plurality of initial data sequences according to a procedure of searching for at least one search pattern.

Thus the generator combines the plurality of initial data sequences, thereby rendering the relationship between the output of the generator and the successive internal states of the generator extremely complex, so that it is difficult to predict the next output of the generator with a probability other than about 0.50.

Moreover, this generator is easy to implement at the same time as being effective and of relatively low cost.

The combining means of the generator advantageously include:
  a plurality of pointers in corresponding relationship to a plurality of windows that are adapted to be shifted over the plurality of initial data sequences;
  selection means operating on the plurality of pointers manipulating the plurality of windows to select said at least one search pattern in at least one initial data sequence;
  detection means operating on the plurality of pointers to search for said at least one search pattern in at least one initial data sequence;
  production means for determining an output pattern according to an application that depends on said search and on the content of at least two initial data sequences from said plurality of initial data sequences;
  assignment means for reassigning the correspondences between the plurality of pointers and the plurality of windows and for reassigning the operations of selecting and searching for at least one search pattern within said plurality of initial data sequences; and
  repetition means for generating the pseudorandom data sequence from a succession of output patterns.

Thus these various means of the generator distribute operations over the plurality of initial data sequences, possibly interchangeably, which increases the difficulty of predicting the pseudorandom data sequence at the output of the generator.

An embodiment of the invention provides an encryption/decryption device including an exclusive-OR logic gate and a generator with the above features.

This device combines each bit from the pseudorandom data sequence with a corresponding bit from a data sequence of a message to be encrypted by modulo 2 addition to form an encrypted data sequence of high linear complexity.

Another embodiment of the invention provides a secure system including at least two entities connected via a network, each of said at least two entities including an encryption/decryption device with the above features.

Thus the secure system has a structure that is simple to implement at the same time as employing an inherently complex mechanism.

DETAILED DESCRIPTION OF THE DRAWINGS

Figure 1:
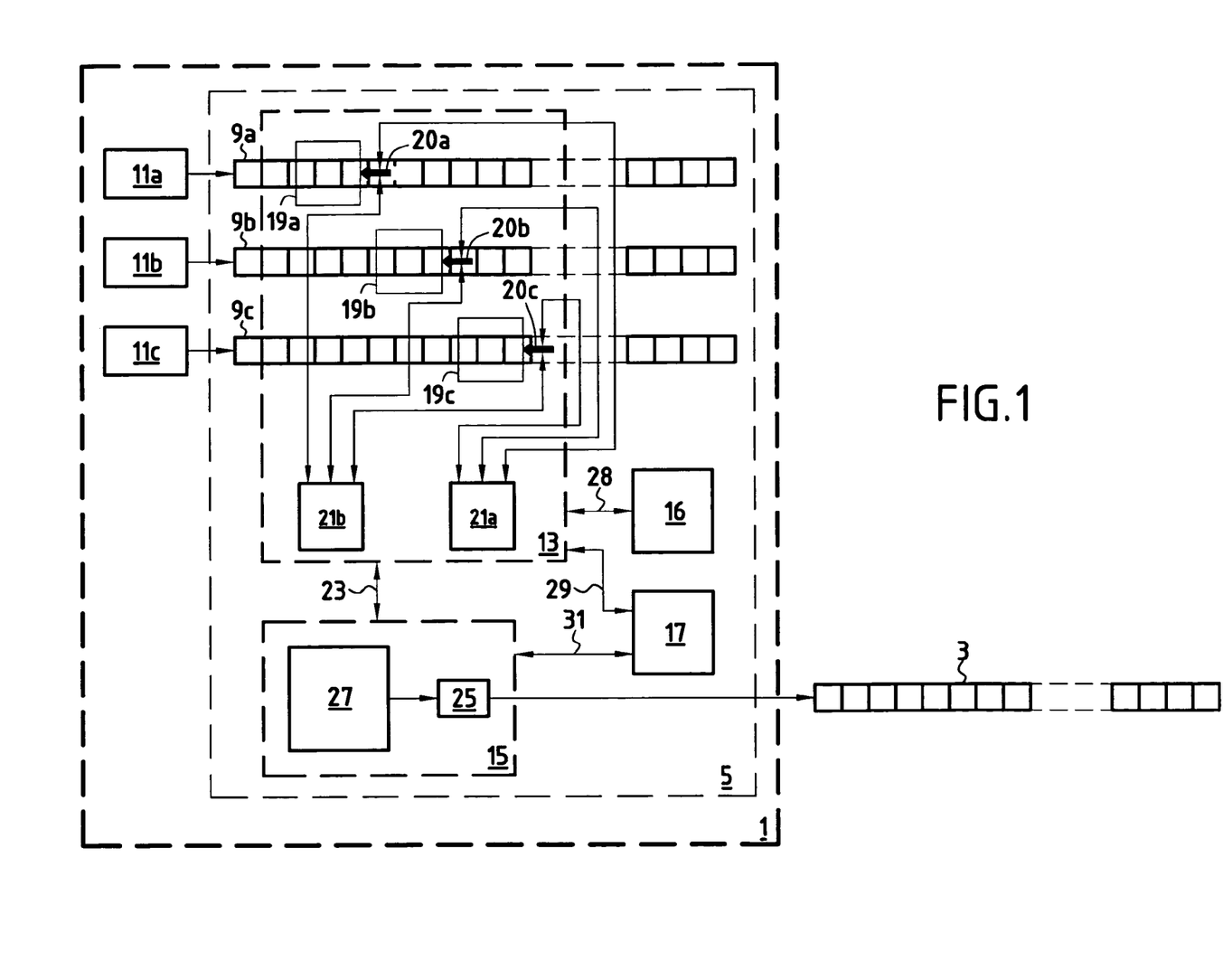
FIG. 1 is a diagram showing one example of a pseudorandom sequence generator of the invention.

FIG. 1 is a diagram showing one example of a generator 1 according to the invention for generating a pseudorandom data sequence 3.

The generator 1 includes combining means 5 for combining data belonging to a plurality of initial data sequences 9a, 9b and 9c in accordance with a procedure for searching for at least one search pattern. The search procedure involves operations that can be assigned to the plurality of initial data sequences in a variable manner.

Below, "pattern" means any word consisting only of 0s and 1s. For example, 0, 11, 000, 1010, 00111 are patterns with respective lengths of 1, 2, 3, 4, and 5. Moreover, an "empty" pattern is an empty word.

Each initial data sequence is a stream of an integer number of bits (for example N bits) of period not equal to "1". Each sequence is generated by initial means that can include a maximum period linear feedback shift register. Thus the generator 1 can include a plurality of shift registers 11a, 11b, and 11c generating the plurality of initial data sequences 9a, 9b, and 9c.

A linear feedback shift register is an array of bits of finite length (the register) provided with a linear combination of the boxes of the array, said combination being represented by a polynomial called the feedback polynomial. On each shift, the bit with the highest index is shifted out, all the other bits are shifted by one index, and the bit with the lowest index takes the value of the linear combination before the shift.

The feedback polynomial can advantageously be a primitive polynomial corresponding to a linear feedback register producing a series of maximum period, for example, or a polynomial in the form $Q=(x^2+1)P$, where P is a primitive polynomial.

It is known that all words or patterns of length L appear at least once in such a series of maximum period T (where $T=2^L-1$).

The combining means 5 of the generator 1 include means 13 for searching for one or several search patterns, determination means 15, assignment means 16, and repetition means 17.

The search means 13 search for one or several search patterns and include a plurality of windows 19a, 19b, and 19c, a plurality of pointers 20a, 20b, and 20c, selection means 21a, and detection means 21b.

The windows 19a, 19b, 19c are of non zero size and are shifted over the plurality of initial data sequences 9a, 9b, 9c. Each window is associated with one and only one initial data sequence 9a, 9b, 9c and can be placed at a particular initial position on an initial data sequence and comprise a particular number of bits. For example, a window of size t placed over an initial data sequence of size N (t being an integer less than N and less than or equal to L) is a mask that can be shifted over that sequence, exposing on each shift exactly t bits of the initial data sequence. Accordingly, on each shift, the bits in the windows $19a$, $19b$, $19c$ can be used to determine the output of the generator $1$.

Moreover, the windows $19a$, $19b$, $19c$ can be manipulated by the pointers $20a$, $20b$, $20c$ that are in corresponding relationship to those windows $19a$, $19b$, $19c$. Note that this correspondence between the windows $19a$, $19b$, $19c$ and the pointers $20a$, $20b$, $20c$ can vary throughout the generation of the pseudorandom data sequence $3$.

The selection means $21a$ operate on the plurality of pointers $20a$, $20b$, $20c$ that manipulate the plurality of windows $19a$, $19b$, $19c$ to select the search pattern or patterns in at least one initial data sequence.

Similarly, the detection means $21b$ can also operate on the pointers $20a$, $20b$, $20c$ to control shifting of the windows $19a$, $19b$, $19c$ over the initial data sequences $9a$, $9b$, $9c$ in order to search for the search pattern or patterns in one or more initial data sequences. Thus the patterns searched for can themselves depend on the content of the windows.

For example, the detection means $21b$ can detect a search pattern of t bits selected by the selection means $21a$ in an initial data sequence of N bits, where t is an integer less than or equal to L. It is therefore certain to find the search pattern in an initial data sequence whose period is equal to $2^L-1$.

Note that the search pattern or patterns can be selected and detected over different initial data sequences or over the same initial data sequences.

Moreover, the determination means $15$ interact with the search means $13$ via a connection $23$ and include an output pattern $25$ and production means $27$.

The production means $27$ determine an output pattern $25$ (for example of t bits) according to an application that depends on the search and the content of at least two initial data sequences from said plurality of initial data sequences $9a$, $9b$, $9c$.

Note that the determination means $15$ can also include control means for defining or updating a set of search patterns. That set of search patterns can be empty, for example, or depend on the content of the windows or on the history of the search for patterns.

Moreover, the assignment means $16$ interact with the search means $13$ via a connection $28$. The assignment means $16$ are adapted to reassign the correspondence between the pluralities of pointers $20a$, $20b$, $20c$ and windows $19a$, $19b$, $19c$ and to reassign the operations of selecting and searching for the search pattern or patterns to the plurality of initial data sequences $9a$, $9b$, $9c$.

Reassignment is advantageously effected as a function of the search, i.e. as a function of the progress of the operations carried out by the search means $13$ and the determination means $15$ and/or the content of at least one initial data sequence from the plurality of initial data sequences $9a$, $9b$, $9c$.

Moreover, the repetition means $17$ are connected to the search means $13$ and the determination means $15$ by respective connections $29$ and $31$.

Thus the repetition means $17$ can exchange signals with the search means $13$ and the determination means $15$ to resume the search pattern search and output pattern determination operations, for example after receiving from the determination means $15$ a signal that an output pattern $25$ had just been determined, as long as a predetermined stopping condition is not satisfied. The repetition means $17$ can furthermore test the stopping condition by exchanging signals with the search means $13$ and the determination means $15$. This generates a succession of output patterns $25$ that by concatenation form the pseudorandom data sequence $3$.

Note that the assignment means $16$ and the repetition means $17$ can also be integrated into the search means $13$ or the determination means $15$.

Accordingly, the various means of the generator $1$ separate the operations of selecting a search pattern, searching for a search pattern, and producing an output pattern. Moreover, these means distribute the steps or operations over a plurality of streams or initial data sequences and modify the assignment mechanism after each execution or production of an output pattern.

Figure 2:
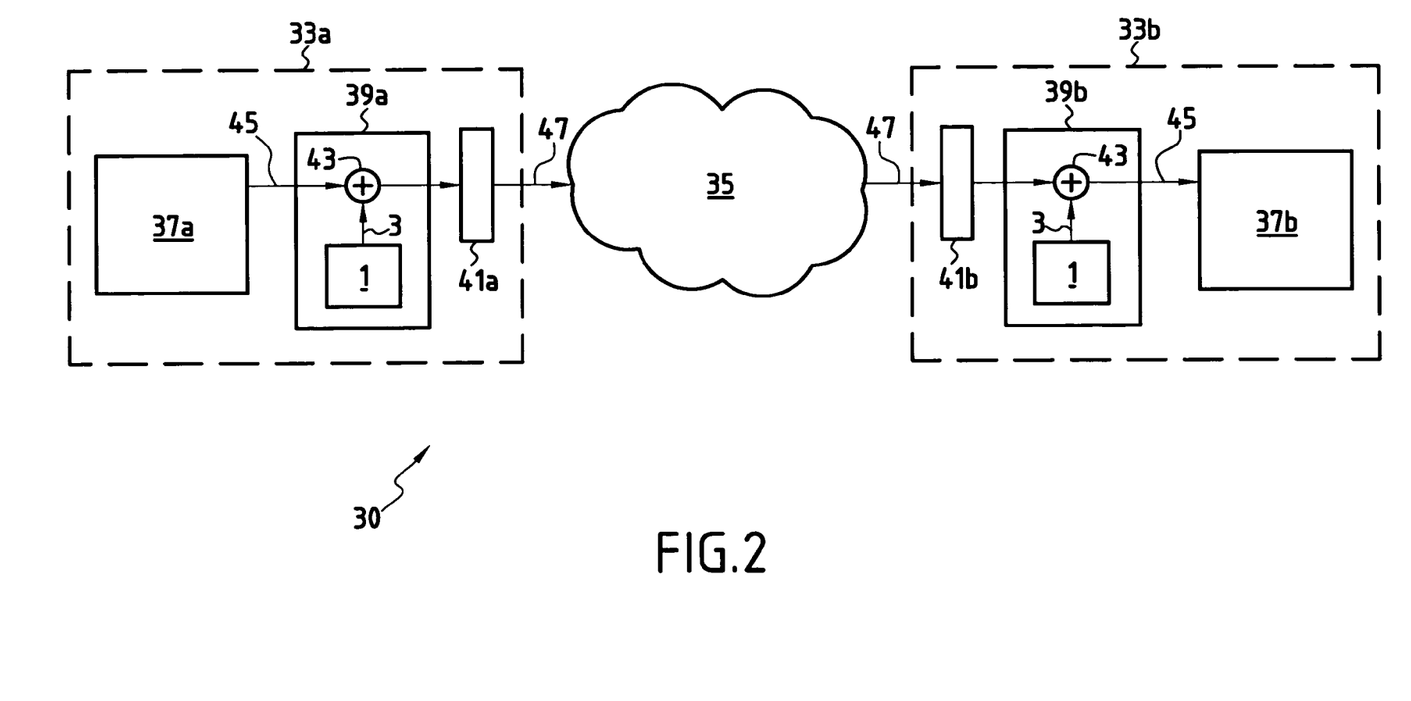
FIG. 2 shows a secure system including generators from FIG. 1.

FIG. 2 shows a secure system $30$ including at least two entities interconnected via a communication network $35$ of Internet, GSM, UMTS, etc. type.

The example of this figure shows a first entity $33a$ connected via the communication network $35$ to a second entity $33b$.

The first entity $33a$ (respectively the second entity $33b$) includes a first terminal $37a$ (respectively a second terminal $37b$), a first encryption/decryption device $39a$ (respectively a second encryption/decryption device $39b$) and a first modem $41a$ (respectively a second modem $41b$), the modems $41a$ and $41b$ consisting of any device providing an interface with the communication network $35$.

Each of the first and second encryption/decryption devices $39a$, $39b$ includes a generator $1$ of a pseudorandom data sequence $3$ as described above and an exclusive-OR logic gate $43$.

Each encryption/decryption device $39a$, $39b$ is adapted to perform streaming encryption or decryption, which consists in encrypting or decrypting a message bit by bit.

In this example, the first encryption/decryption device $39a$ performs an encryption operation. Accordingly, the pseudorandom data sequence $3$, which is called the encryption series, is combined by the exclusive-OR gate $43$ with each bit at the corresponding position of a message $45$ in clear sent by the first terminal $37a$ to obtain an encrypted text $47$ that is then sent by the first modem $41a$ to the second entity $33b$. Thus the encryption operation adds an encryption series $3$ bit by bit to the clear text of the message $45$ to obtain the encrypted text $47$.

The second encryption/decryption device $39b$ performs a decryption operation that adds the same encryption series $3$ bit by bit to the encrypted text $47$ sent by the first entity $33a$ to restore the clear text message $45$. Thus the encryption and decryption operations are identical.

The method of the invention generally comprises generating the pseudorandom data sequence $3$ by combining data belonging to the initial data sequences $9a$, $9b$, $9c$ in accordance with a procedure for searching for at least one search pattern.

Thus there can be n initial data sequences $9a$, $9b$, $9c$ or bit streams. One or more windows of non zero size are shifted over each data sequence, and there can be k windows (k being greater than or equal to n).

At the start of the process, each window is at an initial position on the associated data sequence (for example, each of the windows can be positioned at the beginning of the associated data sequence). The k windows can be manipulated by k pointers $20a$, $20b$, $20c$.

Below, E denotes the value of a search pattern, s denotes the value of the output pattern $25$, and $pf_1, pf_2, \ldots, pf_k$ denote the numbers of the pointers $20a$, $20b$, $20c$ to the k windows.

Moreover, the method of the invention includes a series of steps. A first step selects the search pattern or patterns.

Note that the search pattern or patterns can be predetermined or preferably selected in at least one initial data sequences $9a$, $9b$, $9c$.

A second step searches for the search pattern or patterns in at least one initial data sequence $9a$, $9b$, $9c$.

A third step determines an output pattern 25 of value s according to an application that depends on the search and on the content of at least one initial data sequence from the plurality of initial data sequences $9a$, $9b$, $9c$. Thus the output pattern s can be empty, for example, depend on the content of the windows, or depend on the execution of preceding steps of the method. Determining the output pattern 25 of value s can depend on the search patterns and the search history, in particular the number of steps or iterations effected before finding the search pattern E in question in the initial data sequence or sequences $9a$, $9b$, $9c$.

A fourth step reassigns the operations of selecting and detecting at least one search pattern E within the plurality of initial data sequences $9a$, $9b$, $9c$. The reassignment can be effected as a function of the search and/or of the content of at least one initial data sequence from the plurality of initial data sequences $9a$, $9b$, $9c$.

These preceding steps or operations are repeated successively to form the pseudorandom data sequence 3 from a succession of output patterns 25 of value s.

Furthermore, these operations are effected by a series of rules.

That series of rules includes a first set of rules R1 implemented by the combining means 5 of the generator 1 for defining at least one shift mode for shifting at least one window $19a$, $19b$, $19c$ over each initial data sequence from the plurality of initial data sequences $9a$, $9b$, $9c$ to select and/or detect the search pattern or patterns E.

The first set of rules R1 can define the direction, amplitude or form of shifting the windows $19a$, $19b$, $19c$, for example cyclic shifting over a portion of the initial data sequences $9a$, $9b$, $9c$.

For example, the first set of rules R1 can include a rule $r_{1,1}$ defined as follows:

$r_{1,1}$="shift one bit to the right".

Moreover, the series of operations includes a second set of rules R2 implemented by the combining means 5 of the generator 1 which manages selecting the search pattern or patterns E and/or updating the output pattern s and/or reassigning the operations by means of the pointers $20a$, $20b$, $20c$ manipulating the windows $19a$, $19b$, $19c$.

Finally, the series of operations includes a third set of rules R3 implemented by the combining means 5 of the generator 1 that determine the modes of shifting the plurality of windows $19a$, $19b$, $19c$, for example conditions for stopping shifting of the window or windows over the different initial data sequences $9a$, $9b$, $9c$.

At least one of the updating rules from the second set of rules R2 depend on the execution of at least one of the rules from the third set of rules R3 and at least one of the rules from the first set of rules R1 of the following form: "as long as the content of the window pointed to by $pf_i$ is not a pattern from the set of patterns, shift the windows pointed to by $pf_{j_1}$, $pf_{j_2}$, ..., $pf_{j_n}$ according to the rules $r_{k_1}$, $r_{k_2}$, ..., $r_{ki}$, ..., $r_{k_m}$", where the rules $r_{k_1}$ are rules from the first set of rules R1.

Note that the series of steps or operations can be repeated until a predetermined condition is satisfied. For example, this series of operations is repeated until application of one of the rules causes a window to leave an initial data sequence if this one is of finite size. It is also possible to repeat the series of operations until a condition defined by the user is satisfied.

Moreover, modifying the series of operations after each execution can also be envisaged.

Accordingly, determining the elements of the pseudorandom data sequence of the invention can depend on the distribution of the operations over the initial data sequences, the variation of that distribution, the pattern or patterns searched for, and the history of the search or the manner in which the search has been conducted.

Figure 3:
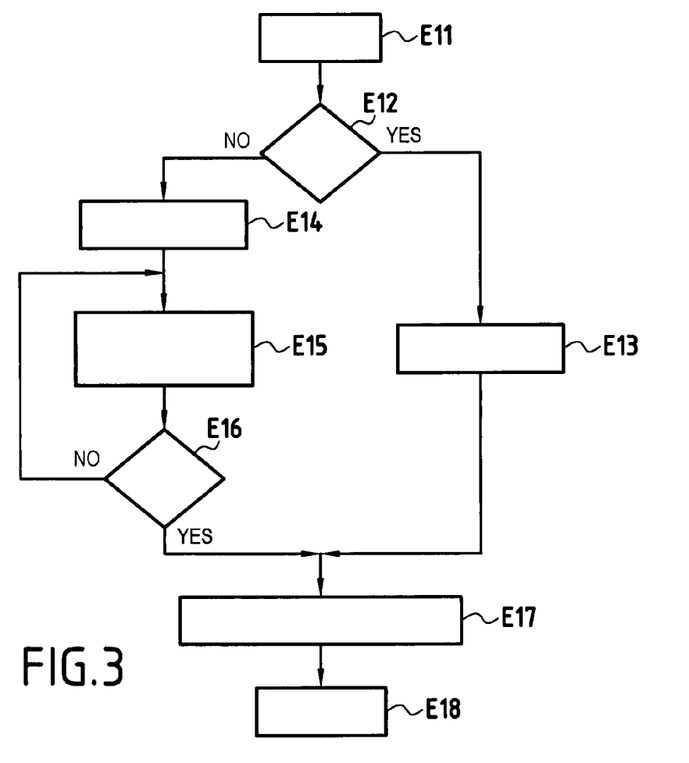
FIGS. 3 to 5 show particular embodiments of a search procedure for generating the pseudorandom data sequence in accordance with the invention.
Figure 4:
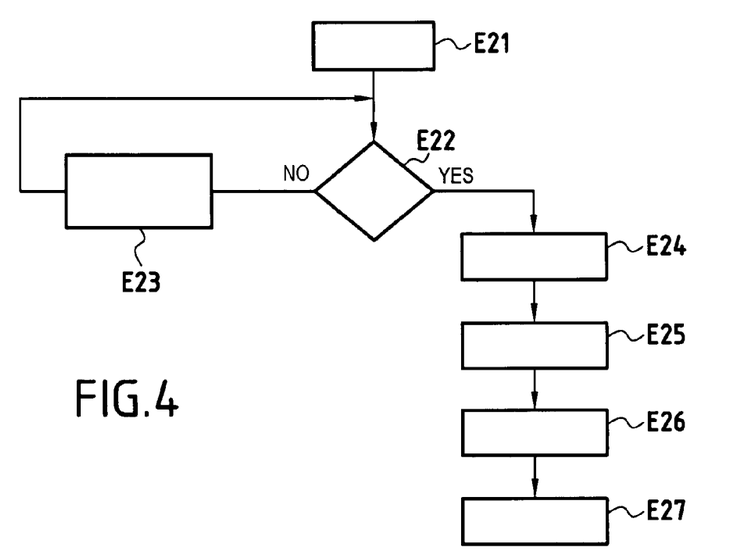
Figure 5:
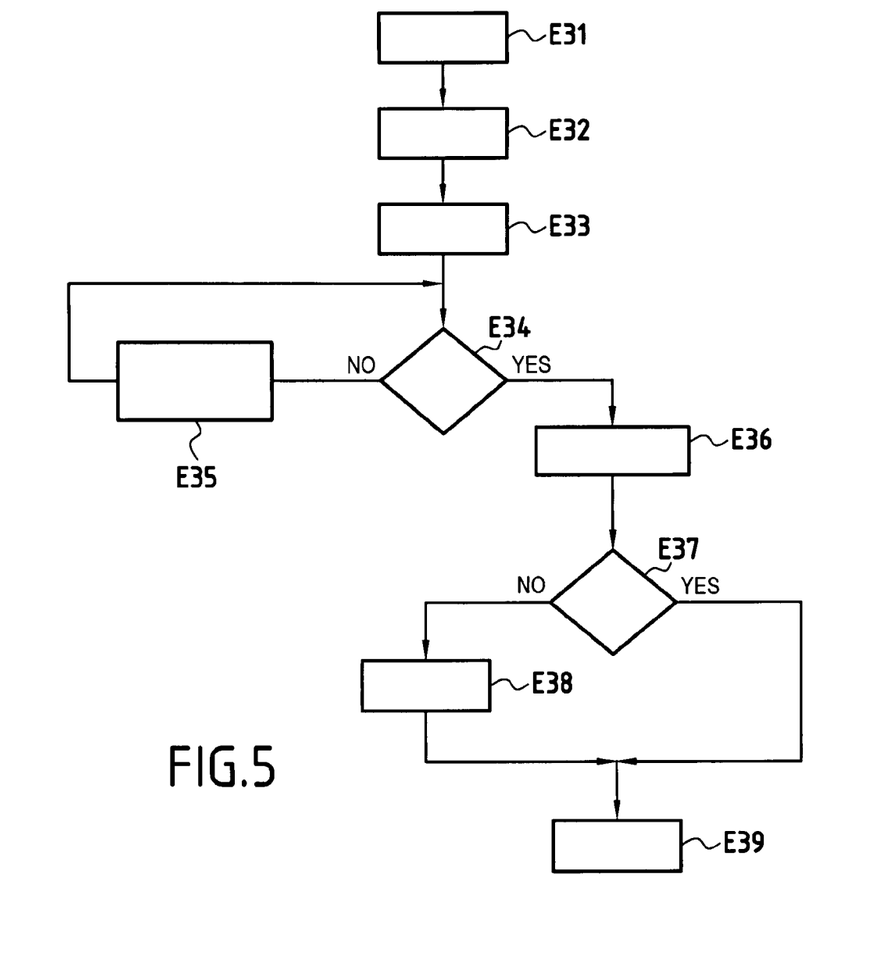

FIG. 3 to 5 show particular embodiments of the method of the invention.

In those embodiments, the series of operations remains invariable after each execution, the plurality of initial data sequences $9a$, $9b$, $9c$ includes at least two initial data sequences that can be the outputs of at least two linear feedback shift registers (LFSR) $11a$, $11b$, $11c$ of maximum period. Moreover, the window or windows $19a$, $19b$, $19c$ are of "size 1" (i.e. each window comprises 1 bit), the set of search patterns contains at most one search pattern E, and the search and output patterns 25 are also of size 1 (i.e. each pattern comprises 1 bit).

Moreover, the amplitude of the shifting of the windows $19a$, $19b$, $19c$ is equal to one unit, i.e. each window is shifted by one bit on each iteration, for example, from the current bit to the next bit (i.e. from left to right).

Accordingly, each initial data sequence $9a$, $9b$, $9c$ can be read continuously, i.e. bit by bit, leading to embodiments that are very simple to implement.

At the outset, the search and output patterns 25 are initialized by assigning an empty bit to each of them, i.e. E←φ and s←φ, φ being the empty set.

In the first embodiment, two windows $19a$ and $19b$ are shifted over two initial data sequences $9a$ and $9b$. The window $19a$ is shifted over the initial data sequence $9a$ and the window $19b$ is shifted over the initial data sequence $9b$. Each window is initialized to the first bit of the associated data sequence. Two pointers $20a$, $20b$ (numbered $pf_1$ and $pf_2$) point to the windows $19a$ and $19b$. In this first embodiment, the pointers $20a$, $20b$ to the windows $19a$ and $19b$ are not modified during execution, i.e. the pointer $pf_1$ always points to the window $19a$ and the pointer $pf_2$ always points to the window $19b$. Similarly, a constant binary value denoted b is defined that remains fixed during execution, i.e. on each application on the series of operations of this first embodiment.

The series of operations of the first embodiment can be defined as follows:

set as the only shifting rule of the first set of rules R1 the rule $r_{1,1}$="shift one bit to the right";

set as updating rules of the second set of rules R2 the following rules:

$r_{2,1}$="place the bit from the window pointed to by $pf_1$ in E";

$r_{2,2}$="if the content of the window pointed to by $pf_2$ is a pattern from E, then update s←b";

$r_{2,3}$="if the content of the window pointed to by $pf_2$ is not a pattern from E, then update s←b⊕1";

set as the third set of rules R3 the following rules:

$r_{3,1}$="as long as the content of the window pointed to by $pf_2$ is not a pattern from E, shift the window pointed by $pf_2$ according to the rule $r_{1,1}$";

$r_{3,2}$="shift the windows pointed to by $pf_1$ and $pf_2$ according to the rule $r_{1,1}$";

apply the rules $r_{2,1}$, $r_{2,2}$, $r_{2,3}$, $r_{3,1}$ and $r_{3,2}$ in that order; and output the output pattern s.

The FIG. 3 flowchart shows the execution of the above series of operations.

In the step E11, the selection means 21a operate on the pointer 20a to select the search pattern E. In other words, this step places the bit from the window 19a pointed to by $pf_1$ in the search pattern E.

The detection means 21b then operate on the pointer 20b (numbered $pf_2$) to search for the search pattern E in the initial data sequence 9b. Thus the step E12 is a test that compares the content of the window 19b pointed to by $pf_2$ to that of the search pattern E.

In the step E13, the production means 27 update the output pattern 25 of value s in accordance with a first law (s←b). Accordingly, if the content of the window 19b pointed to by $pf_2$ is equal to that of the search pattern E then the output pattern 25 assumes the particular value b.

In the step E14, the production means 27 update the output pattern 25 in accordance with a second law (s←b⊕1). Accordingly, if the content of the window 19b pointed to by $pf_2$ is not a pattern from the set E then the pattern s takes the value that is the complement of the bit b, i.e. effects a modulo 2 addition between the particular value b and the value "1", and assigns the result of this addition to the output pattern 25.

In this embodiment, the assignment means 16 always assign the same correspondence between the pointers 20a, 20b and the windows 19a, 19b.

Thus the steps E15 and E16 form a loop that shifts (E15) the window 19b pointed to by $pf_2$ bit by bit toward the next bits provided that the content of the window 19b is not equal to the bit of the search pattern E (test E16).

The step E17 shifts the windows 19a and 19b pointed to by the pointers $pf_1$ and $pf_2$ by one bit, from the current bit to the next bit.

Finally, in step E18, the repetition means 17 cause the output pattern s to be output from the generator 1 in order to generate the pseudorandom sequence 3, so enabling repetition of the preceding steps.

Broadly speaking, the series of operations can be summarized as follows: the bit contained in the window 19a pointed to by $pf_1$ is read, and then as long as the bit contained in the window pointed to by $pf_2$ does not coincide with the bit contained in the window pointed to by $pf_1$, the window pointed to by $pf_2$ is shifted by one position to the right. If the window pointed to by $pf_2$ has not been shifted, then b is output; otherwise, b⊕1 is output. The two windows are then shifted one bit to the right before starting again.

Of course, the flowchart can include a stopping test (not represented in the figure for reasons of simplicity) to determine if a predefined condition is satisfied.

For example, these steps can be repeated to form the pseudorandom data sequence until the window 19b pointed to by the pointer $pf_2$ leaves the initial data sequence 9.

FIG. 4 is a flowchart showing the execution of the series of operations of a second embodiment.

This second embodiment includes three initial data sequences 9a, 9b and 9c and three windows 19a, 19b and 19c of length "1". The window 19a is shifted over the sequence 9a, the window 19b is shifted over the sequence 9b, and the window 19c is shifted over the sequence 9c. Each of the three windows is initially positioned over the first bit of the associated data sequence.

Three pointers 20a, 20b, 20c numbered $pf_1$, $pf_2$ and $pf_3$ to the windows 19a, 19b and 19c are defined. At initialization time, $pf_1$ points to the window 19a, $pf_2$ points to the window 19b, and $pf_3$ points to the window 19c. A fourth pointer numbered $pf_{temp}$ is defined for temporarily storing the value of $pf_1$ during modifications of the values of $pf_1$, $pf_2$ and $pf_3$.

The set E of search patterns is initialized to the empty set before each execution of the series of operations or mechanism of the method.

The mechanism or series of operations of the second embodiment can be defined as follows:
  there is set as the only shifting rule of the first set of rules R1
    the rule $r_{1,1}$="shift one bit to the right";
  there are set as updating rules of the second set of rules R2
    the following rules:
    $r_{2,1}$="place the bit from the window pointed to by p=$f_1$ in E";
    $r_{2,2}$="place the bit from the window pointed to by $pf_3$ in s";
    $r_{2,3}$="modify the values of the pointers by effecting the following circular permutation: $pf_{temp}$ points to the window pointed to by $pf_1$, then $pf_1$ points to the window pointed to by $pf_2$, then $pf_2$ points to the window pointed to by $pf_3$, then $pf_3$ points to the window pointed to by $pf_{temp}$";
  there are set as execution rules of the third set of rules R3
    the rules:
    $r_{3,1}$="as long as the content of the window pointed to by $pf_2$ is not a pattern from the set E, apply the rule $r_{1,1}$ to the windows pointed to by $pf_2$ and $pf_3$";
    $r_{3,2}$="apply the rule $r_{1,1}$ to the windows pointed to by $pf_1$, $pf_2$ and $pf_3$;
    the rules $r_{2,1}$, $r_{3,1}$, $r_{2,2}$, $r_{2,3}$ and $r_{3,2}$ are applied in that order;
    the output pattern s is output.

Accordingly, in the step E21 of the FIG. 4 flowchart, the selection means 21a operate on the pointer 20a to select the search pattern E. This consists in putting the bit of the window 19a pointed to by $pf_1$ in the search pattern E.

The detection means 21b then operate on the pointer numbered $pf_2$ to search for the search pattern E.

The steps E22 and E23 then form a loop that verifies that as long as the content of the window pointed to by $pf_2$ is not a pattern from E (test E22), the windows pointed to by $pf_2$ and $pf_3$ are shifted bit by bit to the right (step E23).

In the step E24, the production means 27 assign to the pattern s the value of the bit of the window pointed to by $pf_3$.

In the step E25, the assignment means 16 reassign the values of $pf_1$, $pf_2$ and $pf_3$ as follows: $pf_1$ assumes the value of $pf_2$, $pf_2$ assumes the value of $pf_3$, and $pf_3$ assumes the preceding value of $pf_1$.

In the step E26, the detection means 21b operate on the pointers to shift the windows pointed to by $pf_1$, $pf_2$ and $pf_3$ bit by bit to the right.

Finally, in the step E27, the repetition means 17 cause the output pattern s to be output from the generator 1 in order to generate the pseudorandom data sequence 3, so enabling repetition of the preceding steps.

Broadly speaking, the series of operations can be summarized as follows: the current bit E of the window pointed to by $pf_1$ is read, and then as long as the bit from the window pointed to by $pf_2$ does not coincide with the bit E, the windows pointed to by $pf_2$ and $pf_3$ are shifted one position to the right; the output pattern s assumes the value of the bit contained in the window pointed to by $pf_3$; the three pointers $pf_1$, $pf_2$ and $pf_3$ are permutated; the three windows are then shifted by one position before starting again.

FIG. 5 is a flowchart showing the execution of the series of operations of a third embodiment.

This third embodiment comprises two initial data sequences 9a, 9b and two windows 19a and 19b. The window 19a is shifted over the sequences 9a and the window 19b is shifted over the sequences 9b. Each window is initially fixed over the first bit of the associated sequence. Two pointers 20a and 20b numbered $pf_1$ and $pf_2$ to the windows 19a, 19b are defined. At initialization, $pf_1$ points to the window 19a and $pf_2$ points to the window 19b.

The mechanism or series of operations of the third embodiment can be defined as follows:

there is set as the only shifting rule of the first set of rules R1 the rule $r_{1,1}$="shift one bit to the right";

there are set as updating rules of the second set of rules R2 the rules:

$r_{2,1}$="place the bit from the window pointed to by $pf_1$ in E";
$r_{2,2}$="assign to s the value of the bit from the window pointed to by $pf_1$";
$r_{2,3}$="exchange the values of the pointers $pf_1$ and $pf_2$";

there are set as execution rules of the third set of rules R3 the rules:

$r_{3,1}$="shift the window pointed to by $pf_1$ according to rule $r_{1,1}$";
$r_{3,2}$="as long as the content of the window pointed to by $pf_1$ is not a pattern from the set E, shift the window pointed to by $pf_1$ according to rule $r_{1,1}$";
$r_{3,3}$="if s is not a pattern from E, then apply rule $r_{2,3}$";

the rules $r_{2,1}$, $r_{3,1}$, $r_{2,2}$, $r_{3,2}$, $r_{3,1}$ and $r_{3,3}$ are applied in that order;

the output pattern s is output.

Accordingly, in the step E31 of the FIG. 5 flowchart, the selection means 21a operate on the pointer 20a to select the search pattern E. This places the bit from the window pointed to by $pf_1$ in the set E.

In the step E32, the detection means 21b shift the window pointed to by $pf_1$ one bit to the right.

In the step E33, the production means 27 cause the pattern s to assume the value of the bit contained in the window pointed by $pf_1$.

The detection means 21b then operate on the pointer numbered $pf_1$ to search for the search pattern E.

Accordingly, the steps E34 and E35 indicate that as long as the content of the window pointed to by $pf_1$ is not a pattern from E (test E34), the window pointed by $pf_1$ is shifted (step E35) bit by bit to the right.

In the step E36, the window pointed to by $pf_1$ is shifted one bit to the right.

The steps E37 and E38 indicate that if the pattern s is not a pattern from the set E, then the values of the pointers $pf_1$ and $pf_2$ are exchanged by the assignment means 16 (step E38).

Finally, in the step E39, the repetition means 17 output the output pattern s from the generator 1.

Broadly speaking, the series of operations can be summarized as follows: the pattern E is initialized with the content of the window pointed to by $pf_1$, then the window pointed to by $pf_1$ is shifted one position to the right and the pattern s assumes the value of the bit from the window pointed to by $pf_1$; as long as the content of the window pointed to by $pf_1$ is not a pattern from E, the window pointed to by $pf_1$ is shifted one position to the right; the window pointed to by $pf_1$ is then shifted one position to the right; if the pattern s is not a pattern from E, then the values from the pointers $pf_1$ and $pf_2$ are exchanged and the pattern s is output.

Thus, starting from a plurality of initial bit sequences, the method of the invention constructs a new bit sequence resulting from shifting windows over the initial sequences in accordance with rules. The selection of patterns is advantageously distributed over a plurality of initial sequences that can be interchanged during the process, thus producing a pseudorandom bit sequence of high quality.

The embodiments described are fast and their hardware implementation is less costly than that of encryption systems using Boolean functions. They are suitable for encrypting high bit rate communications (Internet, GSM, UMTS, WiFi).

Indeed each bit of the pseudorandom data sequence 3 can be combined with a corresponding bit from a data sequence of a message 45 to be encrypted by modulo 2 addition to form an encrypted data sequence 47 (see FIG. 2).

The invention claimed is:

1. A method of generating a pseudorandom data sequence (3) comprising a succession of output patterns (25), wherein the output patterns (25) are obtained by the steps of:
    selecting at least one search pattern;
    searching for said at least one search pattern in at least one initial data sequence that is one of a plurality of initial data sequences (9a, 9b, 9c);
    determining an output pattern (25) according to an application that depends on said search and on the content of at least two initial data sequences from said plurality of initial data sequences (9a, 9b, 9c); and
    reassigning the selection of and the search for at least one search pattern within said plurality of initial data sequences (9a, 9b, 9c).

2. The method according to claim 1, wherein said reassignment is effected as a function of said search and/or the content of at least one initial data sequence that is one of said plurality of initial data sequences (9a, 9b, 9c).

3. The method according to claim 1, wherein said steps are effected by a series of rules including:
    a first set of rules for defining at least one shift mode for shifting at least one window (19a, 19b, 19c) over each initial data sequence of said plurality of initial data sequences (9a, 9b, 9c), there being a plurality of windows (19a, 19b, 19c) because each window is associated with an initial data sequence;
    a second set of rules that manages selecting said at least one search pattern and/or updating said output pattern (25) and/or reassigning the operations by means of a plurality of pointers manipulating said plurality of windows (19a, 19b, 19c); and
    a third set of rules that determine modes of shifting said plurality of windows.

4. The method according to claim 3, wherein said plurality of initial data sequences include at least two initial data sequences and the windows (19a, 19b, 19c) are of size 1 so that said at least two initial data sequences can be read continuously bit by bit to determine an output pattern (25) of 1 bit.

5. The method according to claim 1, wherein each bit of said pseudorandom data sequence (3) is combined with a corresponding bit from a data sequence of a message to be encrypted by modulo 2 addition to form an encrypted data sequence.

6. A generator of a pseudorandom data sequence (3), characterized in that it includes combining means (5) for combining data belonging to a plurality of initial data sequences (9a, 9b, 9c) according to a procedure of searching for at least one search pattern wherein the combining means (5) include:
    a plurality of pointers (20a, 20b, 20c) in corresponding relationship to a plurality of windows (19a, 19b, 19c) that are adapted to be shifted over the plurality of initial data sequences (9a, 9b, 9c);
    selection means (21a) for operating on the plurality of pointers (20a, 20b, 20c) manipulating the plurality of windows (19a, 19b, 19c) to select said at least one search pattern in at least one initial data sequence;
    detection means (21b) for operating on the plurality of pointers (20a, 20b, 20c) to search for said at least one search pattern in at least one initial data sequence;

production means (27) for determining an output pattern (25) according to an application that depends on said search and on the content of at least two initial data sequences from said plurality of initial data sequences (9a, 9b, 9c);

assignment means (16) for reassigning the correspondences between the plurality of pointers (20a, 20b, 20c) and the plurality of windows (19a, 19b, 19c) and for reassigning the operations of selecting and searching for at least one search pattern within said plurality of initial data sequences (9a, 9b, 9c); and repetition means (17) for generating the pseudorandom data sequence (3) from a succession of output patterns (25).

7. An encryption/decryption device (39a, 39b) including an exclusive-OR logic gate (43), further comprising a generator (1) according to claim 6.

8. A secure system (30) including at least two entities (33a, 33b) connected via a network (35), wherein each of said at least two entities includes an encryption/decryption device (39a, 39b) according to claim 7.

* * * * *